United States Patent
Moll et al.

(12)

(10) Patent No.: US 6,265,725 B1
(45) Date of Patent: Jul. 24, 2001

(54) OPTOELECTRONIC DEVICE FOR DETECTING OBJECTS IN A MONITORING RANGE WITH A DISTANCE SENSOR

(75) Inventors: George Moll, Altdorf; Rolf Brunner, Bissingen/Teck, both of (DE)

(73) Assignee: Leuze electronic GmbH & Co., Owen/Teck (DE)

( * ) Notice: Subject to any disclaimer, the term of this patent is extended or adjusted under 35 U.S.C. 154(b) by 0 days.

(21) Appl. No.: 09/653,708

(22) Filed: Sep. 1, 2000

Related U.S. Application Data

(63) Continuation of application No. 09/551,199, filed on Apr. 17, 2000, now abandoned.

(30) Foreign Application Priority Data

Apr. 17, 1999 (DE) .............................................. 199 17 509

(51) Int. Cl.[7] .............................. G01B 11/24; G01C 3/08; G02B 26/08
(52) U.S. Cl. .................................... 250/559.38; 356/4.01; 356/141.4; 356/622
(58) Field of Search .............................. 250/221, 222.1, 250/559.38; 340/555, 556, 557; 356/4.01, 141.1, 141.2, 141.4, 152.2, 622

(56) References Cited

U.S. PATENT DOCUMENTS 5,757,501 * 5/1998 Hipp ...................................... 356/608
5,815,251 * 9/1998 Ehbets et al. ......................... 356/5.01

FOREIGN PATENT DOCUMENTS

| 39 32 844 | 4/1991 | (DE) . |
| 44 05 376 | 2/1995 | (DE) . |
| 195 23 843 | 1/1997 | (DE) . |
| 197 21 105 | 11/1998 | (DE) . |

* cited by examiner

Primary Examiner—Stephone B. Allen
(74) Attorney, Agent, or Firm—Venable; Robert Kinberg

(57) ABSTRACT

An optoelectronic device for detecting objects in a monitoring range with a distance sensor includes a transmitter for transmitting light rays and a deflection unit on which the transmitted light rays are reflected for periodically sweeping the transmitted rays over the monitoring range. A receiver for the light rays is coupled to an evaluation unit. The evaluation unit includes means for storing dimensions of different monitoring ranges and several inputs each of which is operatively associated with a respective one of the stored dimensions of the different monitoring ranges. The evaluation unit further includes a test output for emitting a test signal having a predetermined signal value. A separate feed line is connected to each of the several inputs and a separate switch is connected via a respective one of the feed lines to a respective one of the inputs of the evaluation unit. Upon activation of one of the switches a predetermined signal value is transmitted to the respective input for activating the input thereby activating the respective stored monitoring range so that objects in the activated monitoring range are detected. The test output of the evaluation unit is coupled to each of the feed line. For test purposes, the test signal is transmitted via the test output to each of the feed line. An error-free operation is signified if the predetermined signal value of the test signal is present at the respective inputs of the evaluation unit.

20 Claims, 5 Drawing Sheets

OPTOELECTRONIC DEVICE FOR DETECTING OBJECTS IN A MONITORING RANGE WITH A DISTANCE SENSOR

CROSS-REFERENCE TO RELATED APPLICATIONS

This application is a continuation of application Ser. No. 09/551,199 filed Apr. 17, 2000, now abandoned the subject matter of which is incorporated herein by reference. Priority is claimed in parent application No. 09/551,199 and in this application with respect to application No. 199 17 509.8 filed in Germany on Apr. 17, 1999, the disclosure of which is incorporated herein by reference.

BACKGROUND OF THE INVENTION

The invention relates to an optoelectronic device for detecting objects in a monitoring range with a distance sensor, the device including a transmitter for transmitting light rays; a deflection unit on which the transmitted light rays are reflected for periodically sweeping the transmitted rays over the monitoring range; a receiver for receiving light rays; and an evaluation unit for evaluating the signals received at the receiver.

A device of this type is disclosed in German Patent 39 32 844 C2. The device has a distance sensor that operates according to the triangulation principle and comprises a transmitter for transmitting light rays as well as a receiver which receives light rays and is connected to an evaluation unit. The transmitted light rays are deflected by a deflection unit with a deflection mirror, so that these rays periodically sweep over a monitoring range. The position of the objects is detected by determining the actual angular position of the deflection unit and the range values determined with the aid of the distance sensor.

The dimensions of the monitoring range are stored in the evaluation unit in the shape or outline contour of the monitoring range, in sequential pairs of range and angle values.

In order to detect an object, its position is detected by recording the associated range and angle values. These range and angle values are compared to the stored outline contour of the monitoring range. If it turns out that the object is located inside of the monitoring range, then a signal transmission is triggered.

A disadvantage of this method is that only one monitoring range is stored in the evaluation unit. In practical applications, however, objects frequently must be detected with the aid of an optoelectronic device in different monitoring ranges having different dimensions. For example, if an optoelectronic device is mounted on the front of an unmanned transport vehicle for monitoring the area in front of the vehicle, the dimensions of the monitoring range can depend on whether the vehicle moves in a corridor along a predetermined track or whether it moves freely inside a hall.

For applications of this type, the optoelectronic device is used in particular in the area of protection of persons, so that the optoelectronic device must meet technological safety standards. It is essential that the selection of suitable monitoring ranges also ensures a correspondingly high protection against errors.

German Patent 197 21 105 A1 relates to an optoelectronic sensor, comprising a light transmitter for transmitting a light beam into a monitoring range, as well as a receiver for receiving a light beam formed by the transmitted light that is reflected by an object in the monitoring range. In this case, the angle of the received light beam changes relative to the transmitted light beam, in dependence on the distance between the object and the sensor. The sensor also comprises a control and evaluation unit for processing the output signal from the light receiver. The light receiver is provided with a multi-element light sensor, comprising at least four individual sensor elements, which are arranged next to each other, such that the light beam is admitted to different sensor elements depending on the beam angle. The signal outputs for the sensor elements are connected to switches, wherein the sensor can be adjusted to different reference distances for an object by actuating the switch.

SUMMARY OF THE INVENTION

It is an object of the invention to create an error-free selection of various monitoring ranges for an optoelectronic device of the aforementioned type.

The above and other objects are accomplished according to the invention by the provisions of an optoelectronic device for detecting objects in a monitoring range with a distance sensor, comprising: a transmitter for transmitting light rays; a deflection unit on which the transmitted light rays are reflected for periodically sweeping the transmitted rays over the monitoring range; a receiver for receiving light rays; an evaluation unit for evaluating the signals received at the receiver, the evaluation unit including means for storing dimensions of different monitoring ranges and several inputs each of which is operatively associated with a respective one of the stored dimensions of the different monitoring ranges, the evaluation unit further including a test output for emitting a test signal having a predetermined signal value; several feed lines each of which is connected to a respective one of the several inputs; and several switches each of which is connected via a respective one of the feed lines to a respective one of the inputs of the evaluation unit, wherein upon activation of one of the switches a predetermined signal value is transmitted to the respective input for activating the input thereby activating the respective stored monitoring range so that objects in the activated monitoring range are detected; and wherein the test output of the evaluation unit is coupled to each of the feed lines, and for test purposes the test signal is transmitted via the test output to each of the feed lines, whereby an error-free operation is signified if the predetermined signal value of the test signal is present at the respective inputs of the evaluation unit.

Thus, in accordance with the invention, the dimensions of different monitoring ranges are stored in the evaluation unit of the optoelectronic device. For the selection of one or several of these monitoring ranges, several switches are connected via separate feed lines to an input of the evaluation unit, wherein one stored monitoring range is assigned to each input. As a result of activating a switch, a predetermined signal value is present at the associated input, which corresponds to an activation of this input. By activating this input, the monitoring range assigned to this input is also activated and the objects inside the monitoring range are detected. For test purposes, respectively one signal value is emitted via an output of the evaluation unit to the feed lines. With an error-free operation, this signal value is present at the respective inputs of the evaluation unit.

One essential advantage of the device according to the invention is that an error-free selection of a specific monitoring range can occur by way of a single input of the evaluation unit. The error protection is ensured in that the signal values, issued at the output of the evaluation unit, are fed via the evaluation unit inputs back into this unit and are checked there. This results in a considerable reduction in the switching expenditure as compared to traditional error-free switching arrangements, for which the inputs normally must have a redundant design.

Another advantage of the optoelectronic device according to the invention is that a nearly optional use of switches is possible for selecting the individual monitoring ranges. In particular, the switches can be designed as relays and control outputs, for example SPS controls. Controls of this type permit a central selection of the monitoring ranges. The switches can also be designed as binary sensors, for example formed by light barriers or proximity switches. These sensors can be located on machines, for example, and can serve to determine the actual position of a processing center that can be moved back and forth on the machine. The optoelectronic device is installed on the machine so that it is possible to monitor the area in front of the machine. Depending on the position of the processing center on the machine, one of the switches is activated, whereupon a suitable monitoring range is selected in the optoelectronic device.

Advantageously, the switch between monitoring ranges occurs in that a second switch is activated while a first switch is still activated, thereby allowing objects in two different monitoring ranges to be detected during a transitional period. The first switch is not reset to the starting position until this transitional period is completed, so that only the monitoring range selected with the second switch is still active. In this way, the changeover between two monitoring ranges does not result in a time gap, during which no monitoring range is activated. If such a time gap were to occur, no objects could be detected with the optoelectronic device, thereby resulting in a safety risk for persons in the area surrounding the machine.

BRIEF DESCRIPTION OF THE DRAWINGS

The invention is explained in the following with the aid of the drawings.

DESCRIPTION OF THE INVENTION

Figure 1:
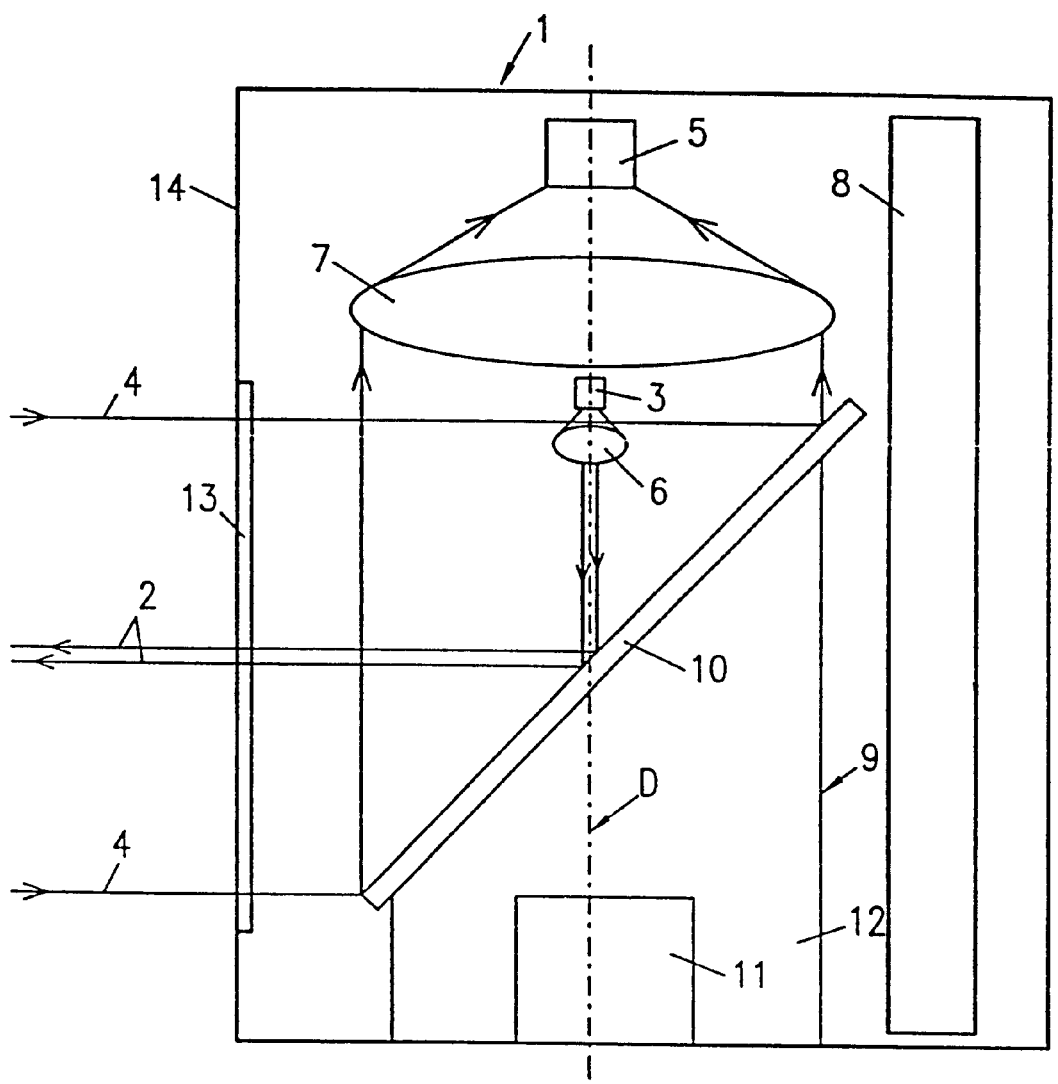
FIG. 1 is a schematic representation of an exemplary embodiment of the optoelectronic device.

FIG. 1 shows an exemplary embodiment of an optoelectronic device 1 for detecting objects. Optoelectronic device 1 comprises a distance sensor, comprising a transmitter 3 for transmitting light rays 2 and a receiver 5 for receiving light rays 4. Transmitter 3 preferably consists of a laser diode with downstream-connected transmitting optic 6 for the beam formation of transmitted rays 2. Receiver 5, for example, is a PIN photodiode with a receiving optic 7 arranged in front.

The distance can be measured on the basis of the phase measuring principle. For this, the laser diode is operated in the CW (continuous wave) mode, wherein an amplitude modulation is impressed on transmitted light rays 2. On the receiving side, the distance information is determined by comparing the phase positions of transmitted light rays 2 and receiving light rays 4, which are reflected back by an object and strike receiver 5.

The evaluation occurs in an evaluation unit 8 to which transmitter 3 and receiver 5 are connected via non-depicted feed lines. Evaluation unit 8 for the present exemplary embodiment is a micro-controller.

As an alternative, the distance can also be measured by the pulse transit-time method, for which transmitter 3 emits short light pulses. The distance information is obtained through a direct measurement of the transit time for a transmitted light pulse to an object and back to receiver 5.

Transmitted light rays 2 and received light rays 4 are conducted over a deflection unit 9. Deflection unit 9 comprises a deflection mirror 10, which sits on a rotating base 12 that is driven by a motor 11. Deflection mirror 10 consequently rotates with a predetermined speed around a vertical axis of rotation D. Transmitter 3 and receiver 5 are arranged in the rotational axis D, above deflection mirror 10.

Figure 2:
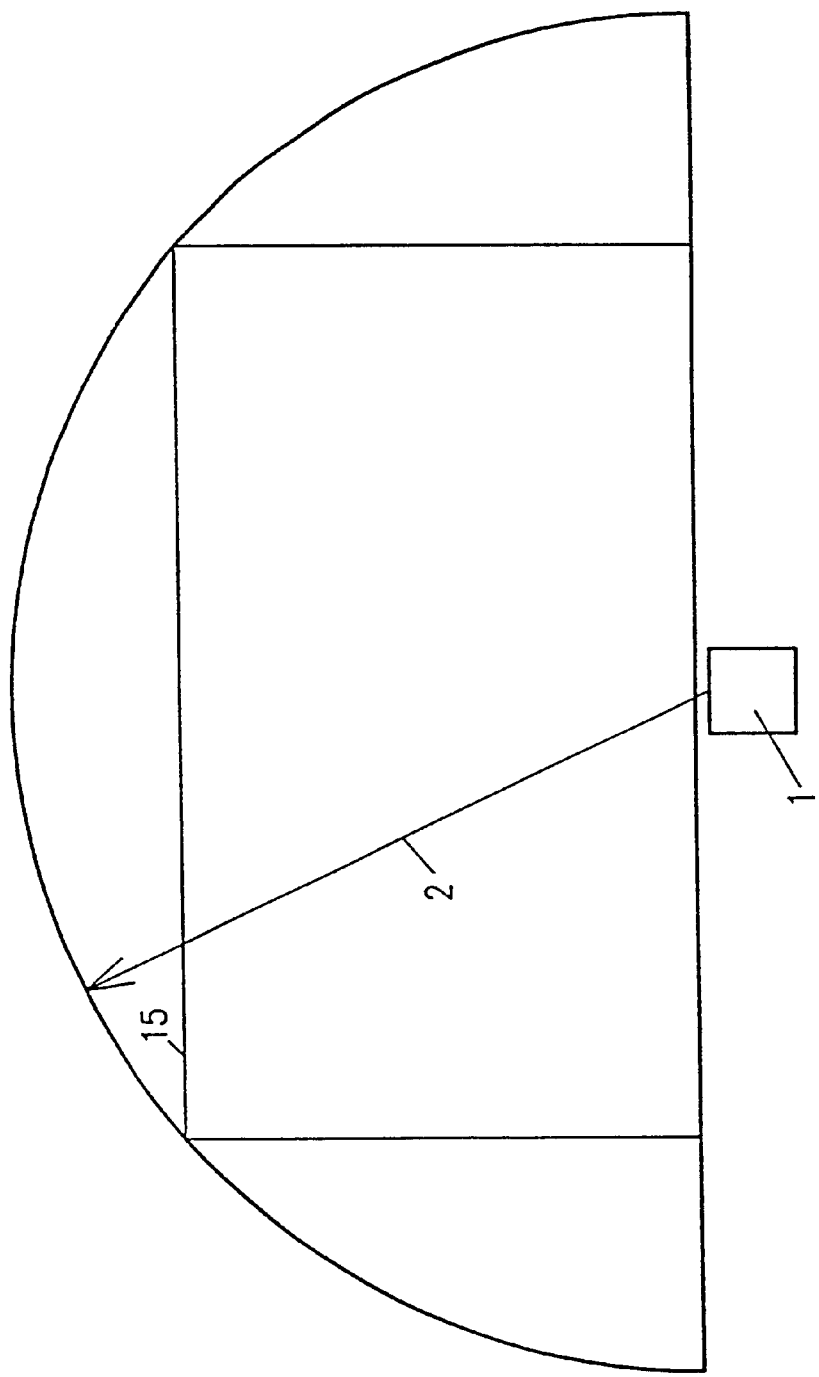
FIG. 2 is schematic representation of a range that is monitored by means of the optoelectronic device according to FIG. 1.
Figure 3:
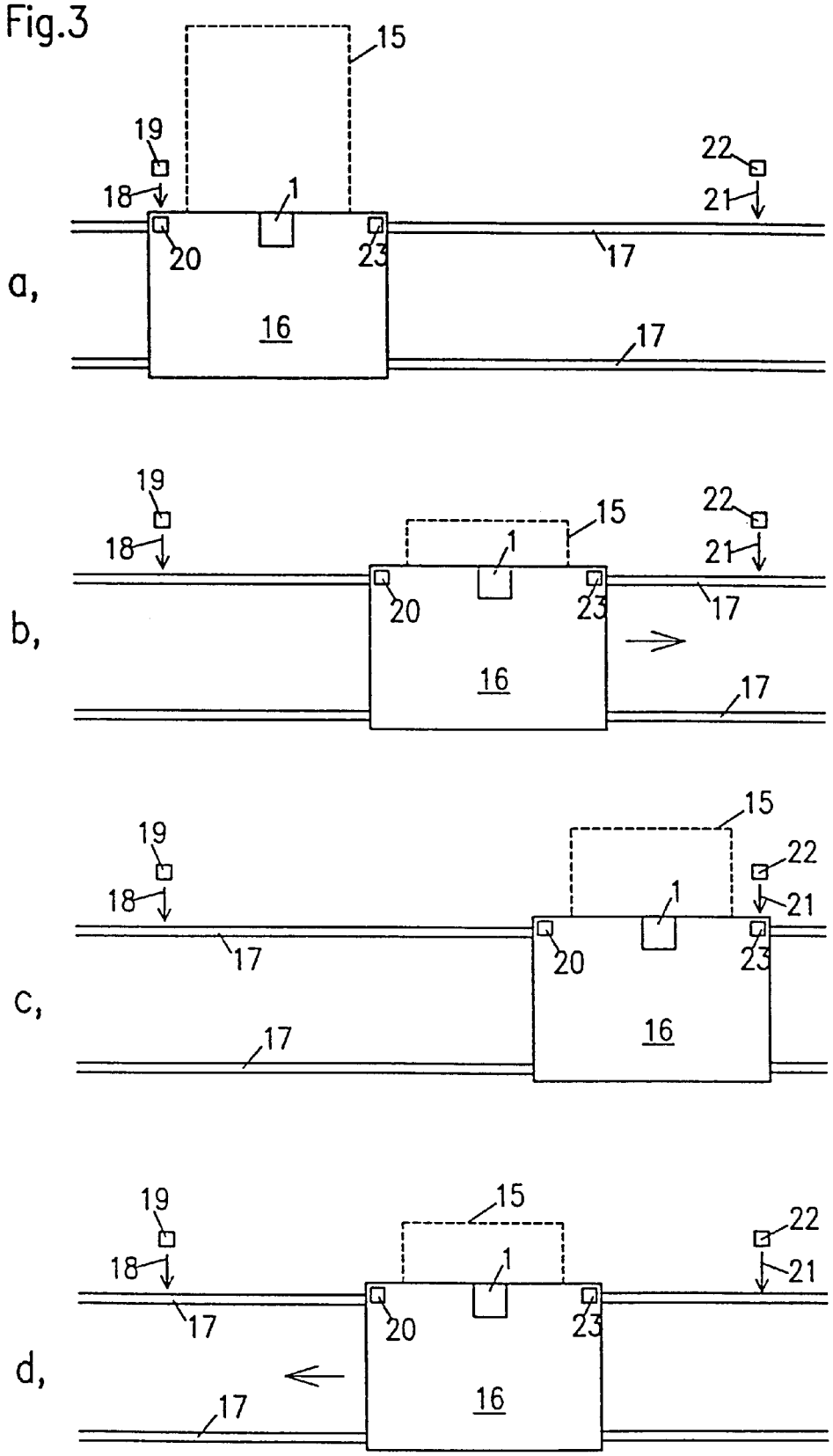
FIG. 3a is a schematic representation of an optoelectronic device that is arranged on a machine moving back and forth on a rail in a first end position of the machine in a first monitoring range that is monitored by the optoelectronic device.
FIG. 3b is a schematic representation of an optoelectronic device that is arranged on a machine moving back and forth on a rail during the drive of the machine from the first to the second end position in a second monitoring range that is monitored by the optoelectronic device.
FIG. 3c is a schematic representation of an optoelectronic device that is arranged on a machine moving back and forth on a rail in a second end position of the machine in a third monitoring range that is monitored by the optoelectronic device.
FIG. 3d is a schematic representation of an optoelectronic device that is arranged on a machine moving back and forth on a rail during the drive of the machine from the second to the first end position in a fourth monitoring range that is monitored by the optoelectronic device.

Deflection mirror 10 is slanted by a 45° angle, relative to the rotational axis D, so that transmitted light rays 2, which are reflected by the deflection mirror 10, leave device 1 in horizontal direction. In the process, transmitted light rays 2 penetrate an exit window 13 that is arranged in the front wall of housing 14 of device 1. Housing 14 has an essentially cylindrical design, wherein exit window 13 covers an angular region of 180°. Accordingly, transmitted light rays 2 sweep over a semi-circular, level surface, as can be seen in FIG. 2, in which objects can be detected. Received light rays 4 that are reflected back by the objects penetrate exit window 13 in the horizontal direction and are guided over deflection mirror 10 to receiver 5.

In order to detect the position of the objects, the actual angle position of deflection unit 9 is detected continuously by means of a non-depicted angle transmitter that is connected to evaluation unit 8. The position of an object is determined in the evaluation unit 8 from the angle position and the distance value recorded for this angle position.

Optoelectronic devices 1 of this type are in particular used in the area of personal protection, wherein evaluation unit 8 has a redundant design to meet the technical safety requirements.

With such safety-technical applications, the detection of objects and persons typically does not occur over the complete area, over which transmitted light rays 2 sweep, but within a limited monitoring range 15, an example of which is shown in FIG. 2. Monitoring range 15 shown therein is formed by a rectangular, planar surface. As soon as an object or a person enters this monitoring range 15, an object is reported. This object report can be used, for example, for shutting down a machine where the area in front is monitored by means of the optoelectronic device 1.

The dimensions of monitoring range 15 are stored in evaluation unit 8 as a parameter set. The position values for an object, recorded by the device 1, are compared in evaluation unit 8 with stored monitoring range 15. With the aid of this comparison, an evaluation is made whether the object has entered monitoring range 15. If so, the object report is made.

For many safety-technological applications it may be necessary to detect objects at different times in differently configured monitoring ranges 15.

An exemplary embodiment of this type is shown in FIGS. 3a–3d. The optoelectronic device 1 is thus attached to one side of the front of a machine 16 that is positioned movably on rails 17. Machine 16 can be a machine tool, a folding press or the like, wherein the area surrounding it is monitored for safety reasons by means of optoelectronic device 1. FIGS. 3a–3d show that the dimensions of monitoring range 15 depend on the positioning of machine 16 on rails 17.

In FIG. 3a, machine 16 is positioned in a first end position where light rays 18 from a transmitter 19 of a first light barrier impinge on the associated receiver 20 of this light barrier. The light barrier thus forms a limit switch for detecting the first end position of machine 16. Receiver 20 of the light barrier is arranged at one end of machine 16 while transmitter 19 is arranged stationary in front of machine 16. In this position of machine 16, the objects must be detected by the optoelectronic device 1 inside a first monitoring range 15, shown in FIG. 3a.

The receiver 20 of the light barrier is connected to a non-depicted control for machine 16, which controls the movements of machine 16 along rails 17. Optoelectronic device 1 is also connected to this control.

With the arrangement shown in FIG. 3b, the machine 16 moves along rails 17 from a first end position in the direction of a second end position, wherein machine 16 is controlled by the control unit. During this movement of machine 16, objects must be detected by optoelectronic device 1 in the second monitoring range 15, shown in FIG. 3b.

With the arrangement shown in FIG. 3c, machine 16 is in the second end position, which is monitored by means of a second light barrier. Transmitter 22 of the light barrier, which emits light rays 21, is again mounted stationary in front of machine 16. Receiver 23 is arranged on machine 16, so that light rays 21 that are emitted by transmitter 22 hit receiver 23 while machine 16 is in the second end position. With this arrangement, objects must be detected with the optoelectronic device 1 in the third monitoring range 15, shown in FIG. 3c.

Finally, machine 16 shown in FIG. 3d moves along rails 17 from the second end position in the direction toward the first end position. During this movement, objects must be detected inside the monitoring range 15 that is shown in FIG. 3d.

According to the invention, the dimensions for all monitoring ranges 15 shown in FIGS. 3a–3d are stored in the optoelectronic device 1. Thus, one of the monitoring ranges 15 can be activated through a switching operation, so that the objects in the activated monitoring range 15 can be detected by means of optoelectronic device 1. The switches S1–S4 B (see FIG. 4) are used to switch between the different monitoring ranges 15.

Figure 4:
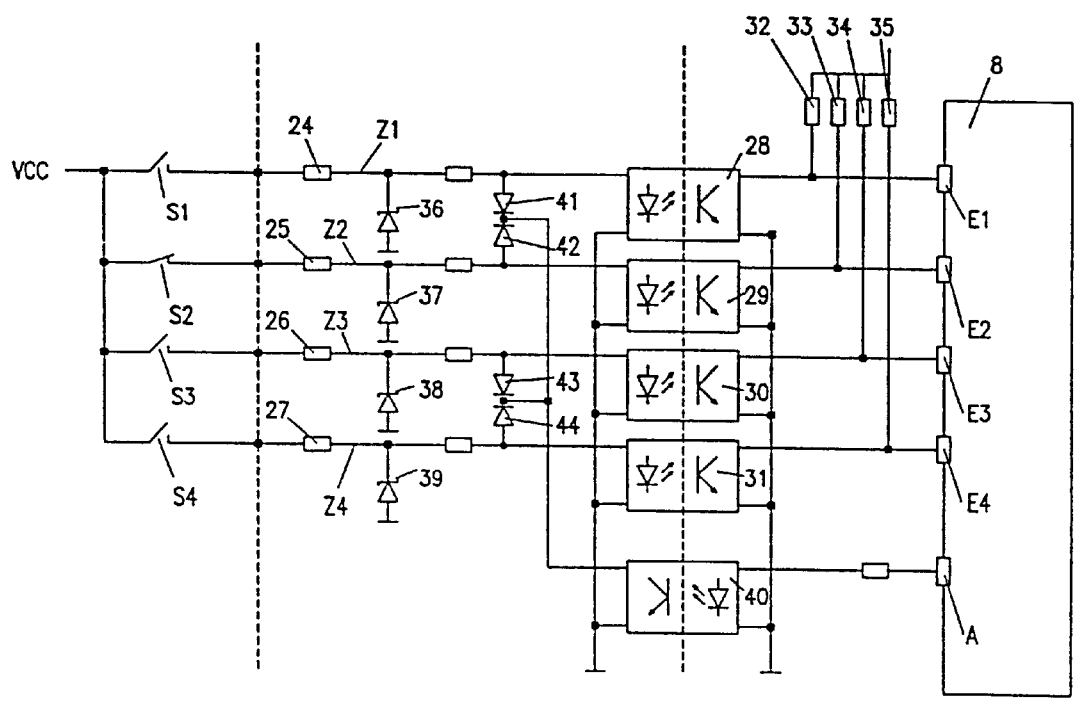
FIG. 4 is a circuit schematic for connecting several switches to the evaluation unit of the optoelectronic device according to FIG. 1.
Figure 5A:
FIG. 5 is a pulse diagram for the circuit schematic according to FIG. 4.
Figure 5B:
Figure 5C:
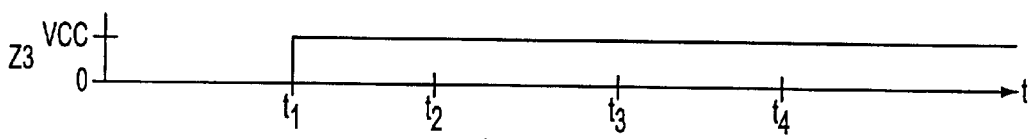
Figure 5D:
Figure 5E:
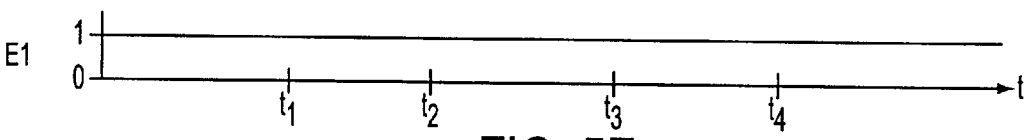
Figure 5F:
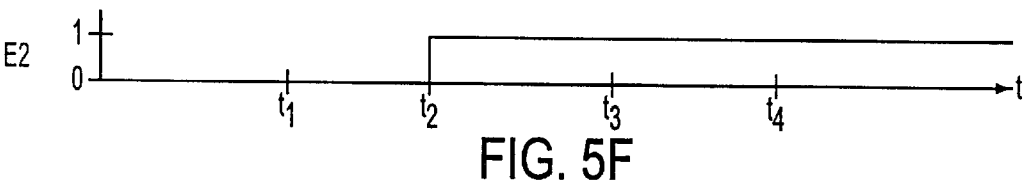
Figure 5G:
Figure 5H:
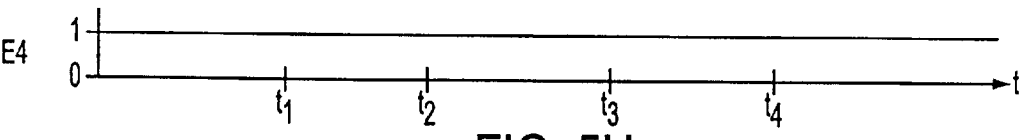
Figure 5I:
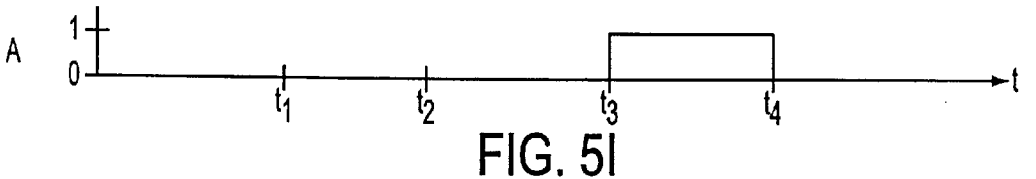

FIG. 4 shows an exemplary embodiment of the connection diagram for connecting switches S1–S4 to evaluation unit 8 of optoelectronic device 1. With this exemplary embodiment, a total of four switches S1–S4 are connected to an input E1–E4 of evaluation unit 8 that is designed as a micro-controller. A stored monitoring range 15 is assigned to each individual input E1–E4, so that a switching between four different monitoring ranges 15 is possible on the whole. Since more or fewer switches S1–SN can in principle be connected to one of the inputs E1–EN of evaluation unit 8, a total of N monitoring ranges 15 can be selected.

Switches S1–S4 can be relays, outputs of control units, or even binary sensors, for example light barriers or proximity switches. For the exemplary embodiment, two of the switches S1, S3 according to FIG. 4 are the light barriers on machine 16 according to FIG. 3.

The other two switches S2, S4 are separate outputs on the control unit for machine 16.

Each of switches S1–S4 is connected via a feed line Z1–Z4 to an input E1–E4 of evaluation unit 8, wherein respectively one resistor 24, 25, 26, 27 and one optocoupler 28, 29, 30, 31 are connected in series in each feed line Z1–Z4. Inputs E1–E4 of evaluation unit 8 are galvanically separated from switches S1–S4 by optocouplers 28–31. An arrangement of additional resistors 32, 33, 34, 35 is also connected between optocouplers 28–31 and inputs E1–E4 of evaluation unit 8. Suppressor diodes 36, 37, 38, 39 are furthermore connected to feed lines Z1–Z4 as protection against transient excess voltages. Finally, a test output A in evaluation unit 8 is connected via an additional optocoupler 40 and an arrangement of diodes 41, 42, 43, 44 to the feed lines Z1–Z4. These connections make it possible to simultaneously transmit a signal at output A of evaluation unit 8 to all feed lines Z1–Z4 between switches S1–S4 and inputs E1–E4 of the evaluation unit 8.

A specific monitoring range 15 is selected by activating the respective switch S1, S2, S3 or S4. If the respective switch S1, S2, S3 or S4 is activated, a supply voltage VCC is present in the respective feed line Z1, Z2, Z3 or Z4. As a result of the protective circuit with suppressor diodes 36–39, supply voltage VCC can vary over a wide range, typically between 16 and 30 volt, wherein a constant current nevertheless flows through the downstream connected optocoupler 28, 29, 30 or 31.

This current will activate the respective input E1, E2, E3 or E4 in evaluation unit 8. In the present exemplary embodiment, each of the inputs E1–E4 can assume two signal values "0" and "1", wherein the signal value "0" is present if the input E1, E2, E3 or E4 is activated.

If one of the switches S1, S2, S3 or S4 is open, the voltage value "0" is present in the corresponding feed line Z1, Z2, Z3 or Z4, so that the associated input E1, E2, E3 or E4 is deactivated and assumes the signal value "1."

The circuit arrangement for connecting switches S1–S4 can be tested via output A of evaluation unit 8, wherein the testing preferably occurs cyclically. For this, evaluation unit 8 emits a separate predetermined signal value via output A to feed lines Z1–Z4, which signal value is read back into evaluation unit 8 via inputs E1–E4. An error-free operation exists if the signal values read out via output A to feed lines Z1–Z4 are again received at the respective inputs E1–E4. The testing confirms that the technological safety requirements for using optoelectronic device 1 in the range of personal protection are met. A particular advantage of the circuit arrangement according to the invention is that no redundant design is required for feed lines Z1–Z4 between a switch S1–S4 and evaluation unit 8 to meet technological safety requirements.

The mode of operation for the circuit arrangement according to FIG. 4 is illustrated in the pulse diagram in FIG. 5. At point in time $t_1$, only switch S2 is activated, so that supply voltage VCC is present in feed line Z2. The remaining switches S1, S3, S4 are not activated, so that the voltage value 0 is present in feed lines Z1, Z3, Z4. Accordingly, only input E2 is activated in evaluation unit 8, so that the signal value 0 is present there. The signal value 1 is respectively present at the other inputs E1, E3, E4, meaning they are deactivated. Thus, until the point in time $t_1$, only second monitoring range 15 is activated as a result of the activation of the second input E2, so that objects are detected in this monitoring range 15 with the optoelectronic device 1.

This case corresponds to the arrangement of machine 16, shown in FIG. 3b. Machine 16 moves between the first end position and the second end position, so that the light paths for the two light barriers, which form switches S1 and S3, are interrupted and therefore not activated. During the movement toward the second end position of machine 16, only the control unit output that functions as switch S2 is activated. The additional output that functions as switch S4 for the movement of machine 16 in the opposite direction is also not activated in this case.

A switch to another monitoring range 15 is initiated between points in time $t_1$ and $t_2$ in that switch S3 is activated in addition to switch S2. As a result, supply voltage VCC is also present in feed line Z3. Accordingly, the signal values 0 are simultaneously present at inputs E2 and E3, so that second and third monitoring ranges 15 are simultaneously activated in evaluation unit 8 and objects are simultaneously detected with optoelectronic device 1 in second and third monitoring ranges 15.

This case corresponds to the positioning of machine 16 in the second end position, which is shown in FIG. 3c. In the time between $t_1$ and $t_2$, the output of the control unit that forms switch S2 is still activated, wherein light rays 21 emitted by transmitter 22 of the second light barrier already impinge on associated receiver 23, so that switch S3 is also activated.

For times higher than $t_2$, machine 16 is stopped, the control unit output that functions as switch S2 is therefore no longer activated while switch S3 that is formed by the second light barrier is activated, as shown in FIG. 3c. The positioning of machine 16 in the second end position is thus completed. Input E2 is accordingly deactivated, so that the signal value 1 is present there while input E3 remains activated. The switching operation from the second to the third monitoring range 15 is thus completed, so that objects are detected only in the third monitoring range 15, as shown in FIG. 3c.

The switching operation according to the invention between the two monitoring ranges 15 has the advantage that a gap in time does not develop during the switching operation, during which none of monitoring ranges 15 is activated. To be sure, if none of monitoring ranges 15 are activated, the specified value for the area of monitoring range 15 is zero and no objects can be detected with optoelectronic device 1. As a result of this, objects or persons could be in the area directly in front of optoelectronic device 1 and thus in the danger zone of machine 16 without being detected, which could endanger the operating personnel for machine 16.

To eliminate this source of danger, optoelectronic device 1 according to the invention permits the simultaneous activation of several monitoring ranges 15 during the switching operation. One advantageous embodiment according to the invention provides that the evaluation unit 8 allows only a specific number N of simultaneously activated monitoring ranges 15, wherein the permissible range $N_{min} \leq N \leq N_{max}$ is preferably in the range of $1 \leq N \leq 2$. It means that either the activation of one monitoring range 15 or a maximum of two monitoring ranges 15 is permissible. If more or fewer than the permissible number of monitoring ranges 15 are activated via switches S1–S4 that are connected to evaluation unit 8, an error message appears in the optoelectronic device 1, whereupon the connected machine 16 is shut down, for example, for safety reasons.

In addition, evaluation unit 8 can be monitored to determine whether the permissible simultaneous activation of several monitoring ranges 15 exceeds a specified desired time interval.

This desired time interval preferably is selected application-specific and defines the maximum time interval for the switching operation between different monitoring ranges 15. An error message is sent if this desired time interval is exceeded.

During the time interval between $t_3$ and $t_4$ of the pulse diagram shown in FIG. 5, the circuit arrangement according to FIG. 4 is tested. For this, output A of evaluation unit 8 is activated. As a result, the signal value 1 is simultaneously transmitted to all feed lines Z1–Z4 via the arrangement of diodes 41–44, thus corresponding to a deactivation of the switches S1–S4. In the process, it is checked in evaluation unit 8 whether the corresponding signal values 1 are present at the inputs E1–E4, as shown in FIG. 5. If that is the case, an error-free operation of the circuit arrangement exists. If the signal value of at least one of inputs E1–E4 deviates from these desired values, an error message is sent. With this type of testing, it is possible to check the operative capacity of optocouplers 28–31, resistors 32–35 and inputs E1–E4 of the circuit arrangement according to FIG. 4. In addition, the operation of switches S1–S4 and feed lines Z1 to Z4 can be checked by checking the bit pattern at inputs E1 to E4 during a change in the monitoring range.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optoelectronic device for detecting objects in a monitoring range with a distance sensor, comprising:

a transmitter for transmitting light rays;

a deflection unit on which the transmitted light rays are reflected for periodically sweeping the transmitted rays over the monitoring range;

a receiver for receiving light rays;

an evaluation unit for evaluating the signals received at the receiver, the evaluation unit including means for storing dimensions of different monitoring ranges and several inputs each of which is operatively associated with a respective one of the stored dimensions of the different monitoring ranges, the evaluation unit further including a test output for emitting a test signal having a predetermined signal value;

several feed lines each of which is connected to a respective one of the several inputs; and several switches each of which is connected via a respective one of the feed lines to a respective one of the inputs of the evaluation unit, wherein upon activation of one of the switches a predetermined signal value is transmitted to the respective input for activating the input thereby activating the respective stored monitoring range so that objects in the activated monitoring range are detected; and wherein the test output of the evaluation unit is coupled to each of the feed lines and for test purposes, the test signal is transmitted via the test output to each of the feed lines, whereby an error-free operation is signified if the predetermined signal value of the test signal is present at the respective inputs of the evaluation unit.

2. The optoelectronic device according to claim 1, wherein the test signal is emitted cyclically via the test output of the evaluation unit for testing purposes.

3. The optoelectronic device according to claim 1, wherein the inputs of the evaluation unit are deactivated to signify an error-free operation in response to the test signal transmitted for testing purposes from test output of the evaluation unit to the feed lines.

4. The optoelectronic device according to claim 3, wherein the evaluation unit produces an error message if at least one of the inputs of the evaluation unit is activated in response to the test signal issued for test purposes from the test output of the evaluation unit.

5. The optoelectronic device according claim 4, including means for activating a non-activated switch to change to a different monitoring range and for subsequently deactivating a previously activated switch.

6. The optoelectronic device according to claim 5, including means for issuing an error message if both switches are activated for a period longer than a specified time period.

7. The optoelectronic device according claim 6, wherein a specified number N of switches is activated simultaneously so that objects are detected in N different monitoring ranges.

8. The optoelectronic device according to claims 7, wherein the specified number N of simultaneously activated switches is in a range $N_{min} \leq N \leq N_{max}$ and if N switches outside of this range are activated simultaneously, an error message is issued.

9. The optoelectronic device according to claim 8, wherein $N_{min}=1$ and $N_{max}=2$ is selected as the range in which switches can be activated simultaneously.

10. The optoelectronic device claim 1, wherein four switches are connected to the evaluation unit.

11. The optoelectronic device claim 1, wherein the switches comprise one of relays and the outputs of control units.

12. The optoelectronic device according to claim 1, wherein the switches are binary sensors.

13. The optoelectronic device according to claim 12, wherein the binary sensors are one of light barriers and proximity switches.

14. The optoelectronic device according claim 1, wherein a supply voltage is present on the respective feed line if a switch is activated.

15. The optoelectronic device according to claim 14, wherein the supply voltage varies over a range of about 16 V to about 30 V.

16. The optoelectronic device according to claim 14, further comprising unidirectional suppressor diodes connected to the feed lines as protection against transient excess voltages.

17. The optoelectronic device according claim 14, wherein the respective input of the evaluation unit assumes the signal value "0" when a switch is activated and the signal value is "1" when the switch is not activated.

18. The optoelectronic device according claim 1, wherein the signal value issued by the output of the evaluation unit for testing purposes in each case is simultaneously transmitted via an arrangement of diodes to the feed lines.

19. The optoelectronic device according to claim 1, further including optocouplers galvanically separating the connected switches from the inputs and the output of the evaluation unit.

20. The optoelectronic device according to claim 1, wherein the evaluation unit comprises a micro-controller.

* * * * *